United States Patent [11] 3,593,302

[72] Inventors Masato Saito;
Yukiyoshi Ochi; Toshihiko Kawanishi, all of Tokyo, Japan
[21] Appl. No. 717,158
[22] Filed Mar. 29, 1968
[45] Patented July 13, 1971
[73] Assignee Nippon Electric Company, Limited, Tokyo, Japan
[32] Priority Mar. 31, 1967
[33] Japan
[31] 42/20528

[54] PERIPHERY-CONTROL-UNITS SWITCHING DEVICE

10 Claims, 13 Drawing Figs.

[52] U.S. Cl. .......... 340/172.5
[51] Int. Cl. .......... G05b 19/00, H04q 3/00
[50] Field of Search .......... 340/172.5, 147; 235/157

[56] References Cited

UNITED STATES PATENTS

| | | | |
|---|---|---|---|
| 3,226,687 | 12/1965 | Amdahl et al. | 340/172.5 |
| 3,226,688 | 12/1965 | Amdahl et al. | 340/172.5 |
| 3,226,689 | 12/1965 | Amdahl et al. | 340/172.5 |
| 3,226,692 | 12/1965 | Fuller et al. | 340/172.5 |
| 3,268,866 | 8/1966 | Van't Slot et al. | 340/147 |
| 3,274,554 | 9/1966 | Hopper et al. | 340/172.5 |
| 3,286,240 | 11/1966 | Thompson et al. | 340/172.5 |
| 3,345,618 | 10/1967 | Threadgold | 340/172.5 |
| 3,372,378 | 3/1968 | Devore et al. | 340/172.5 |
| 3,223,976 | 12/1965 | Abbott et al. | 340/172.5 X |
| 3,274,561 | 9/1966 | Hallman et al. | 340/172.5 |
| 3,286,236 | 11/1966 | Logan et al. | 340/172.5 |
| 3,323,109 | 5/1967 | Hecht et al. | 340/172.5 |
| 3,343,132 | 9/1967 | Hanson et al. | 340/172.5 |
| 3,376,554 | 4/1967 | Kotok et al. | 340/172.5 |
| 3,398,405 | 8/1968 | Carlson et al. | 340/172.5 |
| 3,411,143 | 11/1968 | Beausoleil et al. | 340/172.5 |
| 3,419,849 | 12/1968 | Anderson et al. | 340/172.5 |

*Primary Examiner*—Paul J. Henon
*Assistant Examiner*—R. F. Chapuran
*Attorney*—Ostrolenk, Faber, Gerb and Soffen

ABSTRACT: Switching means for use in interconnecting a plurality of central processors with a plurality of peripheral units automatically so as to allow instantaneous switchover for the purpose of computation in a priority arrangement, or, alternatively, to allow for coupling of the peripheral units to a standby central processor under control of a program command in the case where the online central processor experiences a failure, a defect, or other type of problem affecting normal operation.

INVENTORS
MASATO SAITO
YUKIYOSHI OCHI
BY TOSHIHI KAWANISHI

Ostrolenk, Faber, Gerb & Soffen
ATTORNEYS

INVENTORS
MASATO SAITO
YUKIYOSHI OCHI
BY TOSHIHI KAWANISHI

Ostrolenk, Faber, Gerb & Soffen
ATTORNEYS

INVENTORS
MASATO SAITO
YUKIYOSHI OCHI
TOSHIHI KAWANISHI
BY
OSTROLENK, FABER, GERB & SOFFEN
ATTORNEYS

PERIPHERY-CONTROL-UNITS SWITCHING DEVICE

The present invention relates to central processing devices such as computers, data processors, and the like, and more particularly to a periphery-control-units switching device for use with central processors, and the like, to enable substantially instantaneous automatic switchover for connecting a standby central processor to the peripheral units, or for connecting plural central processors, and the like, to peripheral units in any predetermined order.

Since the advent of the ENIAC computer developed in 1946, which was one of the first large-scale electronic digital computers, the technical progress of electronic computers has been quite conspicuous. Progress in the electronic computer field has developed to the point where operational speeds have been markedly increased, and the size of such computers has become extremely large. From the viewpoint of both utilization and application of c puters, it is conventional to design electronic computers to control not only a few terminal units, but to the contrary, large-scale systems have been developed in which a plurality of central processing units control peripheral units which may range in quantity up to a few score. For example, such large-scale systems may be comprised of two or more central processing units which are designed to control peripheral units which may be constituted of printers, magnetic tap units, magnetic drums, card readers, paper tape readers, paper tape punchers, card punchers, and so forth.

As such systems increase in size and complexity, any fault developed in any of the devices forming part of the system is not confined to that one particular part in which the fault originated, but is extended to the entire system and may finally lead to a paralysis of the system. Thus, in the design of large-scale systems, it is quite important to provide a capability in which a plurality of electronic computers may both share a plurality of periphery-control-units and peripheral units (which are designed to be controlled by the periphery-control-units and which may be comprised of line printers, card reader punches, magnetic drums, magnetic tapes, magnetic discs, and so forth). The peripheral units may normally be connected to one selected electronic computer and, when that electronic computer can no longer operate in normal fashion due to any fault or defect in the computer, it becomes important to provide means whereby the computational operations already in progress may be continued without interrupting their operation.

Up until the present time, such changeover connections have been carried out manually, requiring the operation in progress to be interrupted for a relatively long period of time until the changeover is completed.

The present invention provides novel means for overcoming the disadvantages of conventional systems whereby, when an electronic computer becomes inoperable, the peripheral units may be immediately connected to another computer, allowing the computational operations already in progress to be continued substantially without interruption.

The concept of the present invention may be summarized in the following manner:

The switching means of the present invention comprises bistable switches which will hereinafter be referred to as "-switch flops," each of which is assigned to each central processing unit. The switch flops are operated by program commands for the purpose of changing over interconnections between a plurality of central processing units and a plurality of peripheral units which may be shared by the central processing units in any preselected pattern, or which may be connected to a standby central processing unit in the case where the central processing unit presently connected to the peripheral units experiences a failure. In addition thereto, the switching means of the present invention further provides a periphery-control-units switching arrangement which is capable of rejecting or annulling a command issued from a central processing unit desired to be connected to the peripheral units in the case where another central processing unit has already been connected to the peripheral units. Alternatively, changeover may be effected in accordance with a priority order, or still further, the switching means is capable of generating an interrupt signal and applying the interrupt signal to a central processing unit other than that unit which has issued a command of releasing a connection.

The basic arrangement of the present invention is as follows:

A plurality of central processors are selectively connected to peripheral units (such as magnetic tapes, magnetic drums, line printers, card reader punchers, and the like) by means of a periphery-control-units switching device (or devices) which selectively couple the central processors to the peripheral units further by means of periphery-control-units which enable the central processors to exert control over the peripheral units for the purpose of transferring information to and from the central processor. The periphery-control-units switching devices are connected to incoming and outgoing trunks of each central processing unit and each peripheral unit is thereby able, under control of the central processing units, to changeover signal wires and its power sources to the preselected central processing unit. Further means are provided to prevent more than one central processor from simultaneously exerting control over the same peripheral unit and, under certain circumstances in accordance with priority commands, interrupt signals may be provided for disconnecting a peripheral unit from one central processor and automatically connecting it to the central processing unit having priority. The interrupt capability of the periphery-control-units switching device is such as to be capable of sending an interrupt signal to the central processing unit other than that which has issued a command for releasing a connection, thereby providing that central processing unit with an immediate indication of an interrupt status.

It is, therefore, one object of the present invention to provide switching means for use in large-scale computer systems comprised of a plurality of central processors and a large number of peripheral units which is capable of performing automatically by command a changeover of peripheral units from one central processing unit to another.

Another object of the present invention is to provide a novel switching means for use in large-scale computer systems comprised of a plurality of central processing units and a large number of peripheral units wherein the switching means provides a shared file system wherein exterior (peripheral) memory devices such as magnetic tapes, magnetic drums, magnetic discs, or disc packs, are selectively shared by a plurality of central processing units in any predetermined arrangement.

These as well as other objects of the present invention will become apparent when reading the accompanying description and drawings in which.

Figure 1:
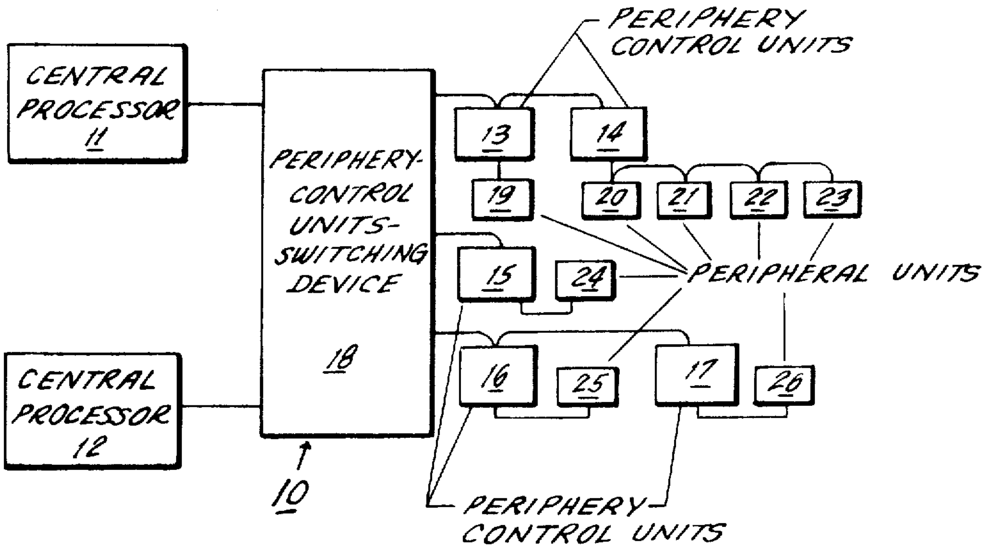
FIG. 1 is a block diagram showing a computer system employing the switching means of the present invention.
Figure 2:
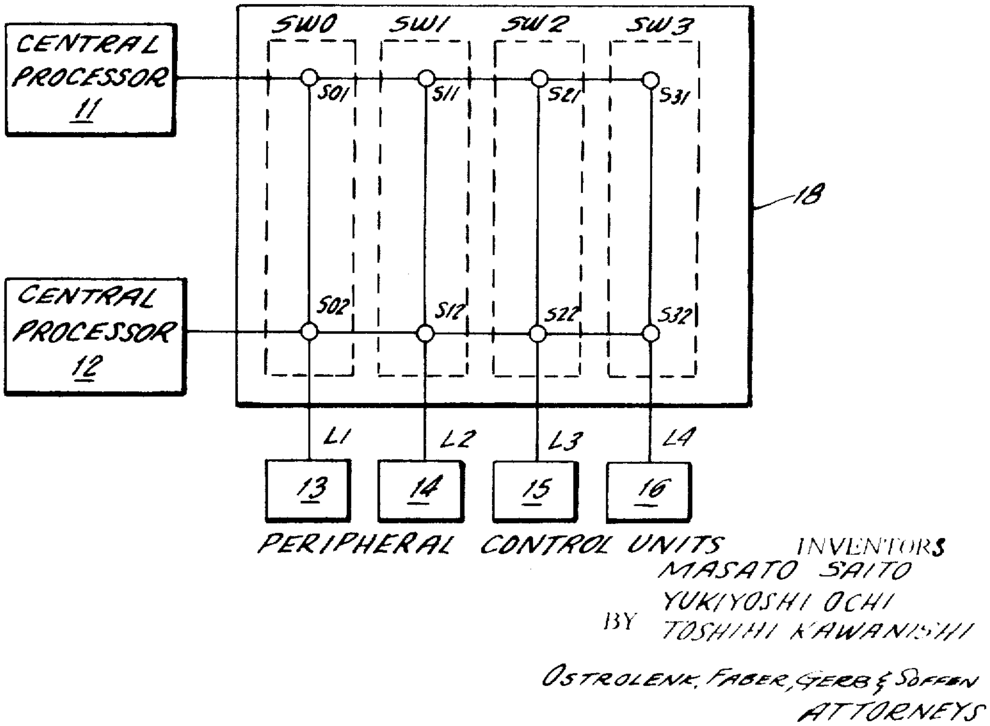
FIGS. 2 and 3 are block diagrams showing other alternative embodiments of computer systems employing the switching means of the present invention and showing the periphery-control-units switching device in somewhat greater detail.
Figure 3:
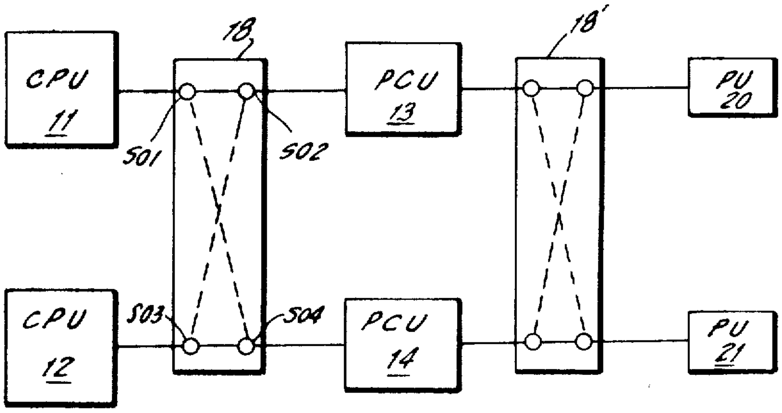

FIGS. 4*a* and 4*b*, FIGS. 5*a* through 5*d*, FIGS. 6*a* and 6*b* and FIGS. 7*a* and 7*b* are circuit diagrams showing electronic circuits employed in the periphery-control-units switching devices shown in block diagram form in FIGS. 1 through 3.

FIG. 1 shows a large-scale computer system 10 comprised of two central processing units 11 and 12 which control periphery-control-units 13 through 17 by means of a periphery-control-units switching device 18. The periphery-control-units 13 through 17, respectively, control the peripheral units such as the line printer 19, magnetic tapes 20—23, card reader puncher 24, magnetic drum 25 and line printer 26. The periphery-control-units 13 through 17 can be connected with either of the central processing units 11 or 12 by control of the switching device 18 and the periphery-control-units 13—17. The connections between the central processing units 11 and 12 and the periphery-control-units 13—17 and peripheral units 19—26 are determined by the operation of the switch flops Ss of the periphery-control-units switching device 18 which, in turn, is under command of each of the central processing units 11 and 12. It should be obvious that any number of periphery-control-units (for example, the units 13—17) may be connected to the periphery-control-units switching device 18, depending only upon the capacity thereof.

FIG. 2 shows another embodiment of the present invention in which the central processing units 11 and 12 may be selectively interconnected to the periphery-control-units (13 through 16, for example) by means of the periphery-control-units switching device 18 which, in turn, is comprised of switches SW0 through SW3 capable of coupling either of the central processors 11 and 12 to the periphery-control-units 13 through 16 by means of the lines L through L , respectively. Each of the switches SW0 through SW3 is provided with a pair of switch flops S01–S02 through S31–S32. The switch flops S01, S11, S21 and S31 are associated with central processor 11, while switches S02, S12, S22 and S32 are associated with central processor 12. When selected ones of the switch flops Ss are in the ON state, related periphery-control-units 13 through 16 and peripheral units (not shown in FIG. 2) are connected to corresponding central processing units. For example, let it be assumed that the switch flops S02, S11, S22 and S31 are all on the ON state. In this condition, central processor 11 is connected through switches SW1 and SW3 and lines $L_2$ and $L_4$, respectively, to the periphery-control-units 14 and 16, respectively, which in turn control their associated peripheral units (not shown in FIG. 2). At the same time, central processor 12 is connected through switches SW0 and SW2 and lines $L_1$ and $L_3$, respectively, to periphery-control-units 13 and 15, respectively, which in turn control their associated peripheral units (not shown). In this condition, the periphery-control-units 13 and 15 are under direct and independent control of central processor 12, while periphery-control-units 14 and 16 are under direct and independent control of central processor 11.

Figure 4A:
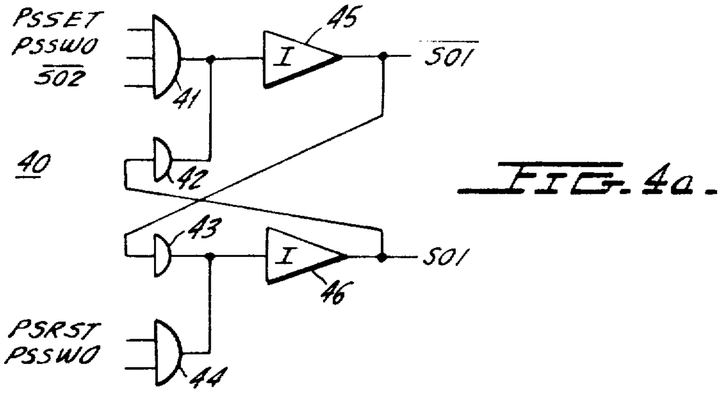
Figure 4B:
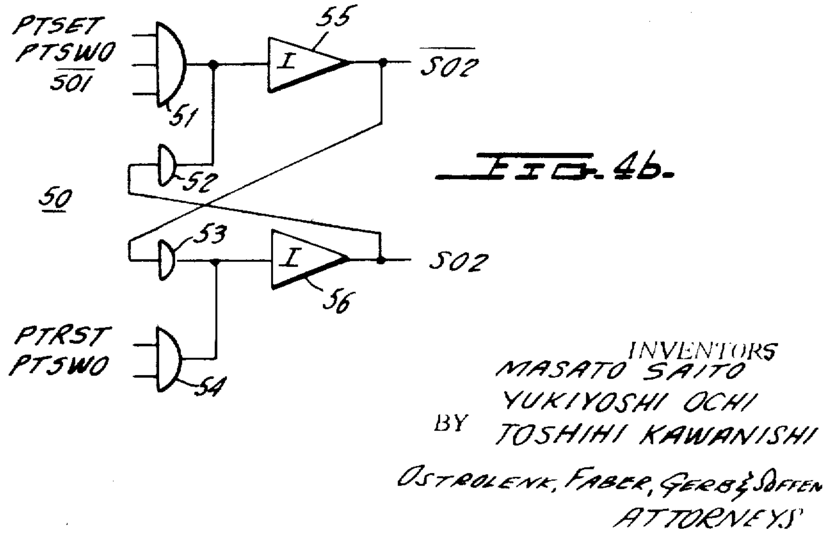

Each of the switch flops Ss may be comprised of a flip-flop circuit such as shown in FIGS. 4*a* and 4*b*. As one example, the flip-flop 40 of FIG. 4*a* is comprised of gates 41 through 44 and inverters 45 and 46. The flip-flop 40 which may, for example, be utilized as the switch flop S01, may be turned ON by receiving a command from one of the central processing units (11 or 12, for example) which is requesting connection to one of the periphery-control-units through the periphery-control-units switching device 18. A command format may, for example, be the following:

| Command Code | A Address | $C_1$ | $C_2$ | $C_3$ | $C_4$ |
|---|---|---|---|---|---|

The A Address designates a branch address of main memory, the control characters $C_1$ and $C_2$ respectively designate read-write channels, and incoming and outgoing trunks of the periphery-control-units switching device 18. For example, the control character $C_1$ may designate a readout operation from one of the peripheral units, while the control character $C_2$ would designate an outgoing trunk of the periphery-control-units switching device for transferring the readout from the peripheral unit to the central processor. The control characters $C_3$ and $C_4$ respectively provide for address designations of switches SW0 through SW3, and various operational commands.

When the flip-flop 40, shown in FIG. 4*a*, is desired to be turned ON (provided that the flip-flop 50, shown in FIG. 4*b*, is desired to be in the OFF state), a setting command PSSET is generated by the central processing unit in operation. A further signal is also generated identifying that switch SW0 to be turned ON (which signal is represented by PSSWO). Gate 41 (which is an AND gate) receives the signals PSSET, PSSWO and $\overline{S02}$ (from the $\overline{S02}$ terminal of flip-flop circuit 50, shown in FIG. 4*b*), thereby opening or enabling gate 41. The signal $\overline{S02}$, when ON, indicates that flip-flop circuit 50 of FIG. 4*b* is in the OFF state. The three above-mentioned signals turn on gate 41 whose signal is inverted by inverter circuit 45, placing the output terminal $\overline{S01}$ in the OFF state. This OFF state signal is passed through single input AND gate 43 and inverter 46 to output terminal S01, which is now in the ON state. The ON state is cross-coupled through single input gate 42 to the input of inverter 45 to maintain the output terminals S01 and $\overline{S01}$ in the ON and OFF states, respectively.

At this time, since the reset command signal (PSRST) is not generated and applied to one input of AND gate 44, gate 44 is not enabled. Accordingly, the flip-flop 40 remains in the set state due to the action of inverter 46. The flip-flop 40 remains in the set state until a reset command signal (PSRST) is generated and gate 44 is opened. Gate 44 is a two-input AND gate which becomes enabled upon the presence of a reset signal and a signal (PSSWO) designating the switch being controlled. When these two signals are simultaneously applied, gate 44 is turned ON and its ON state is inverted by inverter circuit 46. The OFF state condition is applied through single input gate 42 to inverter 45 where the signal is again inverted causing the output terminals S01 and $\overline{S01}$ to be in the OFF and ON states, respectively.

During the period in which the terminal S01 is in the ON state, the central processing unit 11 (making reference to FIG. 2) is able to utilize the periphery-control-unit 13 and thereby is enabled to use all peripheral units (not shown) which, in turn, are connected to the periphery-control-unit 13.

Figure 7A:
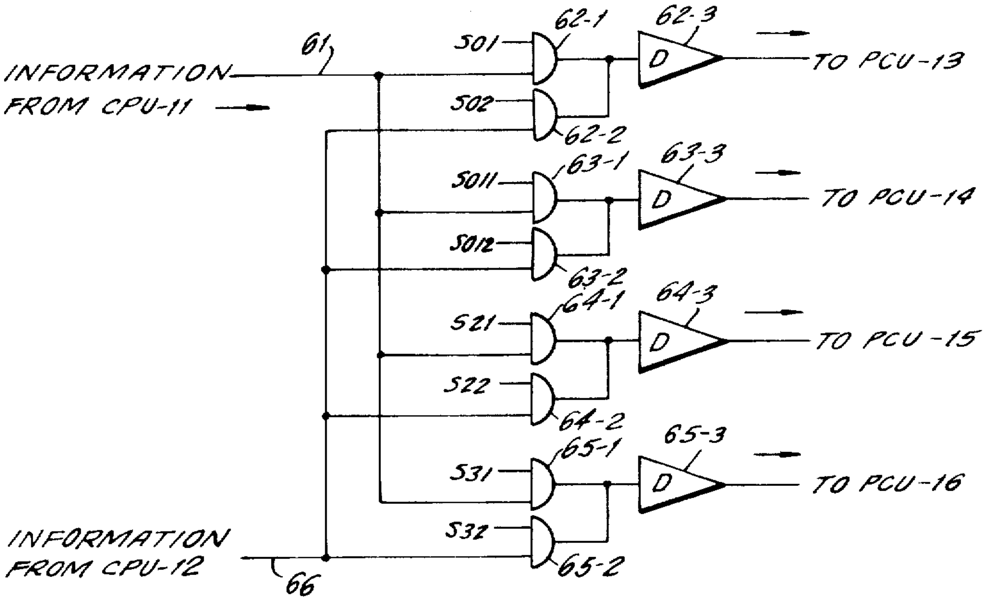
Figure 7B:
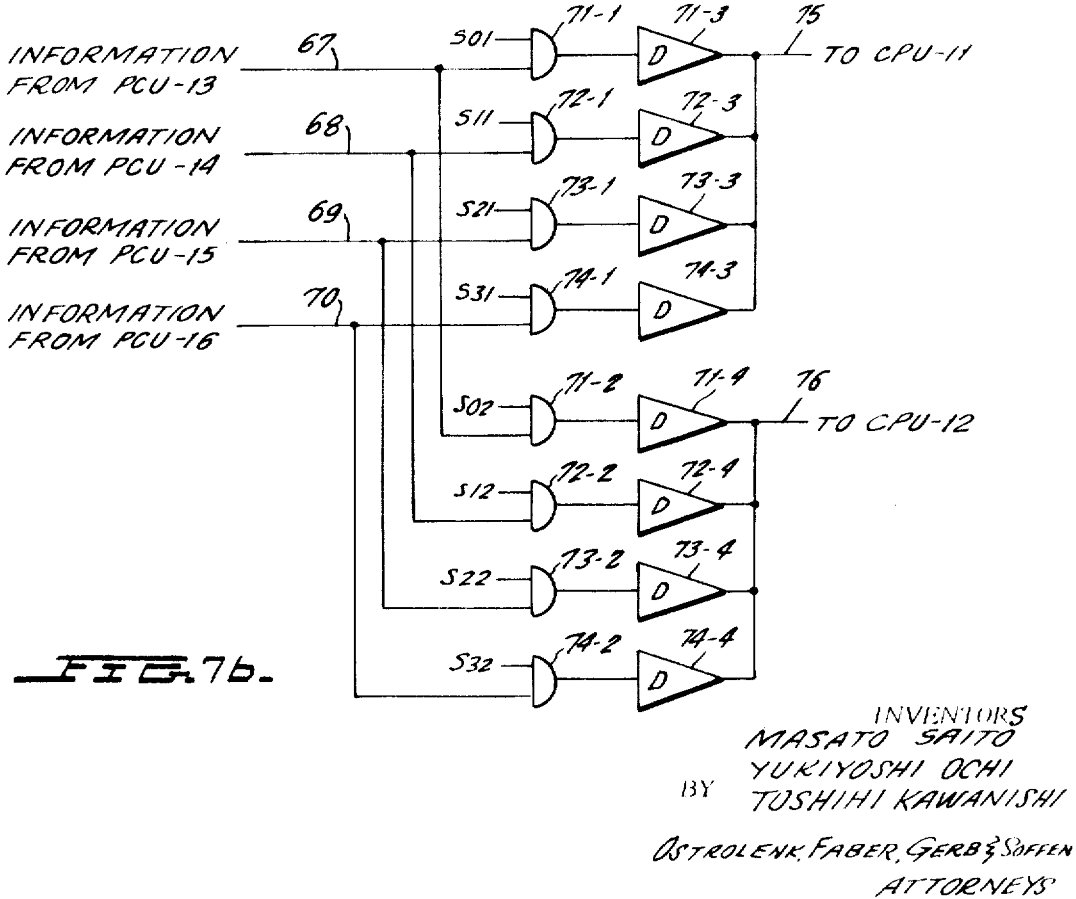

Transfer of data to and from the peripheral units and the central processors may be carried out through the use of the circuitry shown in FIGS. 7*a* and 7*b*. More specifically, information may be transferred from the central processing unit in operation by way of the periphery-control-units switching device to each peripheral unit connected with the switching device and, conversely, information may be transferred from a peripheral unit by way of the periphery-control-units switching device to the central processing unit in operation which is connected thereto by way of the periphery-control-units switching device.

FIG. 7*a*, for example, shows the manner in which information is transmitted from the central processing units selectively to respective peripheral units. Depending upon which of the switch flops Ss are set, the destination of information emitted from the central processing unit is controlled by the state of the switch flops. For example, let it be assumed that switch flops S02, S11, S22 and S31 (see FIG. 2, for example) are in the ON state. In this condition, information is emitted from central processing unit 11 through bus 61 which is coupled in common to one input of each of the gates 62–1 through 65–1. The gates 62–1 through 65–1 are AND gates which transfer the information emitted from central processing unit 11, dependent upon the ON states of the switch flops. With the example given, switch flops S11 and S31 respectively enable AND gates 63–1 and 65–1, causing the information emitted from central processing unit 11 to pass through bus 61, gates 63–1 and 65–1 and driver circuits 63–3 and 65–3 which, in turn, transfer the information to periphery-control-units 14 and 16 (see FIG. 2, for example).

Information emitted from central processing unit 12 is applied to bus 66 which is connected in common to one input of the AND gates 62–2 through 65–2, respectively. With the example given, the ON state of switch flops S02 and S22 enable gates 62–2 and 64–2, respectively, passing the information from bus 66 through gates 62–2 and 64–2 and respectively through drivers 62–3 and 64–3 to the periphery-control-units 13 and 15, respectively (as shown in FIG. 2, for example).

FIG. 7*b* shows a similar arrangement in which information passing from the peripheral units to their associated periphery-control-units may be, in turn, transferred selectively to either one of the central processors. As shown in FIG. 7b, the periphery-control-units have their outputs connected to buses 67 through 70, respectively, each of which buses are respectively connected to a pair of AND gates 71-1 through 74-1 and 71-2 through 74-2. The outputs of gates 71-1 through 74-1 are coupled through drivers 71-3 through 74-3, respectively, which, in turn, are connected in common to an output bus 75 leading to central processing unit 11. In a like manner, AND gates 71-2 through 74-2 are respectively coupled to drivers 71-4 through 74-4 whose outputs are connected in common to output line 76 which leads to central processing unit 12.

Considering again the example given as to the setting of switch flops Ss (and further assuming that information is to be transferred from periphery-control-units to central processors), gates 71-2 and 73-2 are enabled by set signals S02 and S22, respectively, transferring information from periphery-control-units 13 and 15 through the associated drivers 71-4 and 73-4 to the output line 76 leading to central processor 12.

The ON state of switch flops S11 and S31 enable gates 72-1 and 74-1, allowing information from periphery-control-units 14 and 16 to be passed through these gates and drivers 72-3 and 74-3, respectively, to be coupled through output line 75 to central processor 11.

The pair of switch flops Ss assigned to each switch SW must be designed to prevent both of the switch flops from being set in the ON state simultaneously. For example, if one of the switch flops Ss is in the ON state and a switching command is issued to turn the other of the pair of switch flops Ss ON, it is important to provide means for annulling the command and for branching to an A Address. The flip-flops of FIGS. 4a and 4b can be seen to provide this function. For example, let it be assumed that the flip-flop 40 of FIG. 4a is in the ON state so that its output terminal S01 is in the ON state. Assuming that a set signal is applied to flip-flop circuit 50 of FIG. 4b, the enabling signals PTSET and PTSWO are applied to two of the three input terminals of gate 51. The remaining input terminal is coupled to the output terminal $\overline{S01}$. Since output terminal S01 of circuit 40 is in the ON state, output terminal $\overline{S01}$ is in the OFF state and the AND gate circuit 51 is prevented from being enabled. Flip-flop circuit 40 is similarly designed wherein one of the three input terminals to gate 41 is coupled to the output terminal $\overline{S02}$ of circuit 50, thereby rendering it impossible to set the two flip-flops assigned to a single switch SW.

Let it now be assumed that both an ALLOW flip-flop and an INTERRUPT flip-flop are provided for each switch and that the switch is reset on one side of one central processing unit. When an ALLOW flip-flop circuit related to that switch on the side of the central processing unit is in the ON state, if an INTERRUPT flip-flop circuit is turned ON and an INTERRUPT signal is sent to the other central processing unit, when the latter central processing unit will be able to answer to the periphery-control-units switching device.

Figure 5A:
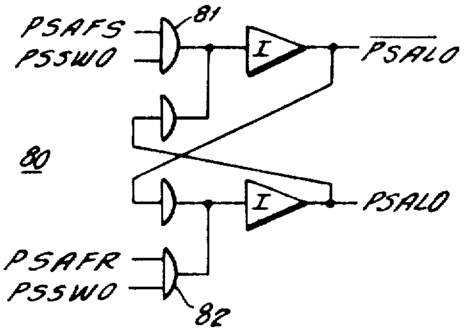
Figure 5B:
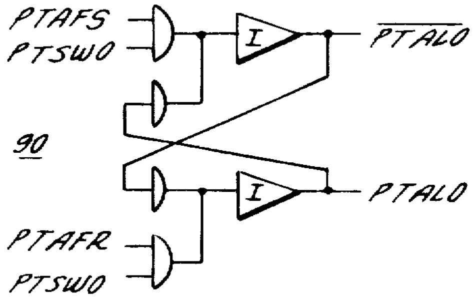

Considering the flip-flop circuits 80 and 90 of FIGS. 5a and 5b, respectively, when a command signal is given to set an ALLOW flip-flop circuit, a signal (PSAFS) is applied to one input terminal of AND gate 81. When that switch (SWO) is designated, a second signal (PSSWO) is applied to the other input terminal of gate 81. Gate 81 is thus opened, and the ALLOW flip-flop output (PSALO) assigned to switch SWO associated with one of the central processing units is placed in the set state and remains in that state until a reset command signal (PSAFR) is applied to one input terminal of AND gate 82 for the purpose of resetting flip-flop circuit 80.

Figure 5C:
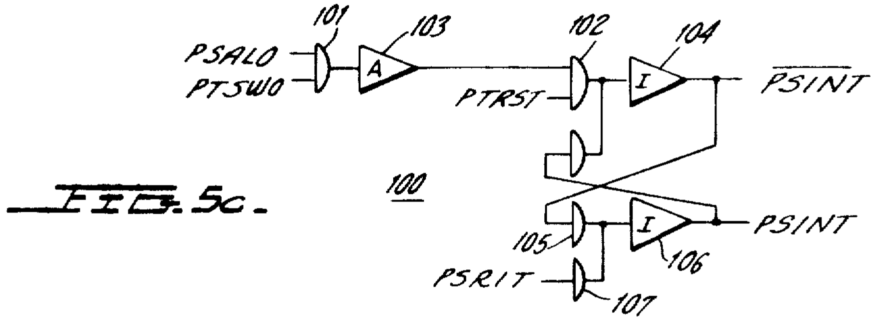
Figure 5D:
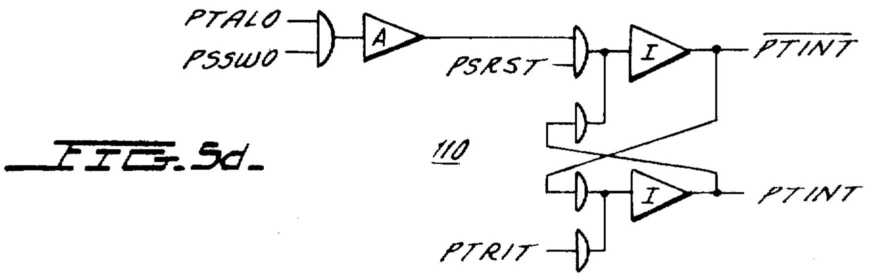

Considering the flip-flop circuits 100 and 110 of FIGS. 5c and 5d, when a reset command is emitted from the other central processing unit for the purpose of resetting switch flop Ss, the signals PTRST and PTSWO are applied to respective input terminals of gates 102 and 101, respectively. The signals PSALO (from the output terminal PSALO of flip-flop circuit 80 of FIG. 5a) and PTSWO (from the central processing unit) are applied to AND gate 101. The gate is enabled, and the signal is passed through amplifier 103 to the remaining input of gate 102. Gate 102 thereby becomes enabled in the presence of the reset command signal and, through the inverter action of inverter circuit 104, causes output terminal $\overline{PSINT}$ to be driven to the low or OFF state. This low level is passed by single input gate 105 and inverted by inverter circuit 106, setting the output terminal PSINT in the ON state. Flip-flop circuit 101 remains in the ON state until a reset signal PSRIT is applied to gate 107.

Flip-flop circuit 90 and flip-flop circuit 110 operate in much the same manner, but are assigned to the opposite central processing units relative to the assignment of flip-flop circuits 80 and 100. This arrangement thereby enables a first central processing unit to develop an ALLOW signal while allowing a second processing unit to generate an INTERRUPT signal, interrupting the first processing unit and vice versa.

Figure 6A:
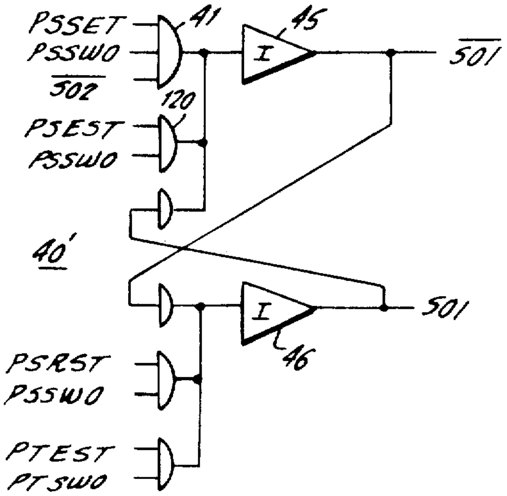
Figure 6B:
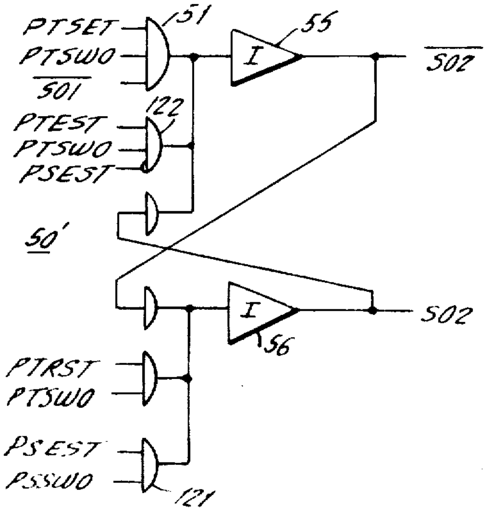

When a switch flop Ss associated with one central processing unit is in the ON state, it is further possible to generate a command for the purpose of preferentially setting a switch flop Ss associated with the other central processing unit. Considering FIGS. 6a and 6b, for example, it can be seen that the flip-flop circuits 40′ and 50′ shown therein are modifications of the flip-flop circuits 40 and 50 of FIGS. 4a and 4b, respectively, wherein additional gates have been added to initiate an operation when a command of setting a switch flop Ss in accordance with a specific priority order is desired. For example, considering FIG. 2, when the central processing unit 11 is assigned priority over central processing unit 12 with respect to the use of periphery-control-unit 13, the central processing unit 11 emits a signal PSEST which is applied to gate 120 of FIG. 6a. The central processing unit 11 also emits a signal PSSWO designating the desired switch to be operated. These two signals enable AND gate 120, causing output terminal S01 to go to the ON state in spite of the fact that switch output terminal S02 of flip-flop circuit 50′, shown in FIG. 6b, is in the ON state, thereby enabling the setting of flip-flop circuit 40′ in accordance with priority, regardless of the fact that flip-flop circuit 50′ is in the set state. The signals PSEST and PSSWO are also simultaneously applied to gate 121 of circuit 50′, enabling this gate, whereupon its ON or enabled signal is inverted by inverter circuit 56, causing output terminal S02 to go to the OFF state.

Considering the case in which a set the command signal is applied to the same switch from two or more central processing units simultaneously, if it is desired that only command of one of the central processing units is to be effective and that a command issued from the other central processing unit is to be rendered ineffective and is branched to an A Address, then no confusion will arise as to which central processing unit exerts control over the switch flops. For example, considering the circuits 40′ and 50′ of FIGS. 6a and 6b, respectively, let it be assumed that the central processing unit associated with circuit 40′ is to have priority over the central processing unit associated with circuit 50′. Let it further be assumed that each of the central processing units generate signals PSEST–PSSWO and PTEST–PTSWO, respectively, gate 120 will be enabled to drive output terminal S01 of circuit 40′ to the ON state. However, gate 122 of circuit 50′ will be inhibited by means of the inhibit input terminal 122a, disabling circuit 50′ from being set in the ON state. The reverse arrangement may be made in the case where the central processing unit associated with circuit 50′ is to have priority over the central processing unit associated with the circuit 40′. An additional gate similar to the gate 122 may be provided for directing a command to be ignored so that it is branched to an A Address.

FIG. 3 shows another alternative embodiment of a large-scale computer system employing two periphery-control-units switching devices 18 and 18′. The central processing units 11 and 12 may be selectively coupled either to the periphery-control-units 13 or 14 by means of the four switch flops provided in switching unit 18. In a like manner, the periphery-control-units 13 and 14 may be selectively coupled to the peripheral units (20 and 21, for example) by means of the periphery-control-units switching device 18', likewise comprised of four switch flops. As one example, switch means 18 may be comprised of switch flops S01 through S04. Switches S01 and S02 may be employed to connect central processor 11 to periphery-control-units 14 and 13, respectively, while switch flops S03 and S04 may be employed to connect central processing unit 12 to periphery-control-units 13 and 14, respectively. The periphery-control-units switching device 18' may be designed in a similar fashion.

Although this invention has been described with respect to particular embodiments, it should be understood that many variations and modifications will now be obvious to those skilled in the art, and, therefore, the scope of this invention is limited not by the specific disclosure herein, but only by the appended claims.

We claim:

1. For use in combination with a computer system comprised of at least two central processors and at least two peripheral units capable of performing, printing, readin, readout and storage functions, the improvement comprising:
  a periphery-control-units switching device being adapted to selectively interconnect said peripherals and said processors in a mutually exclusive fashion;
  a first plurality of processor trunk lines, each connecting an associated processor to said switching device;
  a second plurality of peripheral unit trunk lines, each connecting an associated peripheral unit to said switching device;
  said switching device being comprised of a plurality of groups of switch means;
  each switch means of each group being assigned to an associated processor whereby the switch means group assigned to each processor and forming one of said groups selectively connects the processor trunk line of its associated processor to the same peripheral unit trunk line;
  means cross coupling the switch means of the same group for preventing simultaneous coupling of their associated peripheral unit trunk line with their associated processors.

2. The device of claim 1 wherein each of said switch means is comprised of a bistable flip-flop having set and reset input terminals and having first and second output terminals for selectively generating switching and inhibit signals, respectively, so that said first and second output terminals respectively generate no switching signal and no inhibit signal when a reset signal is applied to said reset input;
  said means cross-coupling said switch means including means for cross-coupling the second outputs to the set inputs of switch means associated with the same peripheral unit trunk line to inhibit setting of one of the switch means when the other of the switch means has previously received a switching signal.

3. The device of claim 2 wherein gate means is provided for each switch means; said gate means having at least first and second inputs for receiving a switching signal from its associated processor and the second inhibit output signal of the switch means of a different switch means group which is associated with the same peripheral units trunk line and having an output coupled to said set input terminal for coupling a switching signal to said set input only in the absence of an inhibit signal.

4. In a system comprising at least two central processors and at least two peripheral units capable of respectively performing printout, readin, readout and storage functions, wherein the improvement comprises a periphery-control-units switching device for selectively interconnecting said peripheral units to said processors, said switching device comprising:
  a pair of cross coupled bistable means each having first and second outputs, each being associated with each of said processors;
  each of said bistable means including:
    first input gating means for setting the first and second outputs of its associated bistable means ON and OFF, respectively when said first gating means receives a set signal from its associated processor and when the second output of the bistable means coupled thereto is in the OFF state;
    and second gating means for setting the first and second outputs of its associated bistable means OFF and ON respectively, upon receipt of a reset signal from its associated processor;
  a pair of third gating means for each peripheral unit for transferring data from said processors to said peripheral units;
  each gating means of each of said pairs of third gating means being enabled by a respective one of said cross-coupled bistable means whereby only one gating means of each pair of third gating means may be enabled during a given time interval to transfer data from only that processor associated with the enabled gating means.

5. The system of claim 1 further comprising means coupled between each pair of bistable means assigned for connecting the processors to the same peripheral unit to prevent simultaneous seizure of its associated peripheral unit by more than one central processor.

6. The system of claim 4 further comprising:
  means coupled between each central processor and the bistable means assigned thereto to enable a central processor to interrupt the control of a peripheral unit already under the control of another central processor, said means further including means for issuing an interrupt signal to the interrupted central processor.

7. The system of claim 4 further comprising priority control means coupled to each of said bistable means responsive to commands from only a preselected central processor for enabling one of said central processors to terminate an established connection between a central processor of lower priority and a peripheral unit by resetting the bistable means responsible for said established connection.

8. The system of claim 4 further comprising a pair of fourth gating means for each peripheral unit for transferring data from said peripheral unit to said processors;
  each gating means of each of said pairs of fourth gating means being enabled by a respective one of said cross-coupled bistable means whereby only one gating means of each pair of fourth gating means may be enabled during a given time interval to transfer data from only that peripheral unit associated with the enabled gating means.

9. In a system comprising at least two central processors and at least two peripheral units capable of respectively performing printout, readin, readout and storage functions, wherein the improvement comprises a periphery-control-units switching device for selectively interconnecting said peripheral units to said processors, said switching device comprising:
  a pair of cross-coupled bistable means each having first and second outputs, each being associated with each of said processors;
  each of said bistable means including:
    first input gating means for setting first and second outputs of its associated bistable means ON and OFF respectively when said first gating means receives a set signal from its associated processor and when the second output of the bistable means coupled thereto is in the OFF state;
  and second gating means for setting the first and second outputs of its associated bistable means OFF and ON respectively upon receipt of a reset signal from its associated processor;
  a pair of third gating means for each peripheral unit for transferring data from said peripheral unit to said processors;
  each gating means of each of said pairs of third gating means being enabled by a respective one of said cross-coupled bistable means whereby only one gating means of each pair of third gating means may be enabled during a given time interval to transfer data from only that peripheral unit associated with the enabled gating means.

10. In a system comprising at least two central processors and at least two peripheral units capable of respectively performing printout, readin, readout and storage functions, wherein the improvement comprises first and second periphery-control-units switching devices for selectively interconnecting said peripheral units to said processors, each of said switching device comprising:

a pair of cross-coupled bistable means each having first and second outputs, each being associated with each of said processors;

each of said bistable means including:

first input gating means for setting the first and second outputs of its associated bistable means ON and OFF, respectively when said first gating means receives a set signal from its associated processor and when the second output of the bistable means coupled thereto is in the OFF state;

and second gating means for setting the first and second outputs of its associated bistable means OFF and ON respectively, upon receipt of a reset signal from its associated processor;

a pair of third gating means for each peripheral unit for transferring data from said processors to said peripheral units;

each gating means of each of said pairs of third gating means being enabled by a respective one of said cross-coupled bistable means whereby only one gating means of each pair of third gating means may be enabled during a given time interval to transfer data from only that processor associated with the enabled gating means.